US007881608B2

(12) United States Patent
Miller et al.

(10) Patent No.: US 7,881,608 B2
(45) Date of Patent: Feb. 1, 2011

(54) METHODS AND APPARATUSES FOR MEASURING JITTER IN A TRANSCEIVER MODULE

(75) Inventors: Frederick W. Miller, Santa Clara, CA (US); James Al Matthews, Milpitas, CA (US)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 524 days.

(21) Appl. No.: 11/746,897

(22) Filed: May 10, 2007

(65) Prior Publication Data

US 2008/0279566 A1 Nov. 13, 2008

(51) Int. Cl.
*H04B 10/12* (2006.01)
*H04B 17/00* (2006.01)

(52) U.S. Cl. .............................. 398/25; 398/22; 398/38; 398/30; 398/31; 398/33; 398/195

(58) Field of Classification Search ............. 398/25–28, 398/39, 136, 137, 162, 22, 195–198
See application file for complete search history.

(56) References Cited

U.S. PATENT DOCUMENTS

| | | | | |
|---|---|---|---|---|
| 5,691,989 | A * | 11/1997 | Rakuljic et al. ............... 372/20 |
| 5,900,959 | A * | 5/1999 | Noda et al. ................. 398/195 |
| 6,252,692 | B1 | 6/2001 | Roberts ....................... 398/147 |
| 6,546,345 | B1 * | 4/2003 | Ghiasi .......................... 702/67 |
| 6,631,144 | B1 * | 10/2003 | Johansen ..................... 370/516 |
| 6,816,987 | B1 * | 11/2004 | Olson et al. ................. 714/704 |
| 7,181,146 | B1 * | 2/2007 | Yorks .......................... 398/195 |
| 7,583,753 | B2 * | 9/2009 | Okamura ..................... 375/296 |
| 7,636,524 | B2 * | 12/2009 | Dorring et al. ............... 398/159 |
| 7,643,752 | B2 * | 1/2010 | Swenson et al. ............... 398/26 |
| 2001/0012320 | A1 * | 8/2001 | Watanabe et al. ........... 375/226 |
| 2003/0058970 | A1 * | 3/2003 | Hamre et al. ................ 375/342 |
| 2003/0081518 | A1 * | 5/2003 | Okubo et al. ............. 369/47.53 |
| 2003/0095304 | A1 * | 5/2003 | Dorring et al. ............... 359/110 |
| 2003/0156787 | A1 * | 8/2003 | King et al. ..................... 385/31 |
| 2003/0165207 | A1 * | 9/2003 | Noguchi et al. ............. 375/371 |
| 2004/0013184 | A1 | 1/2004 | Tonietto et al. |
| 2004/0091032 | A1 * | 5/2004 | Duchi et al. ................. 375/224 |
| 2004/0119548 | A1 * | 6/2004 | Karlquist ..................... 332/112 |
| 2005/0032491 | A1 * | 2/2005 | Carballo et al. ............. 455/135 |
| 2005/0127894 | A1 * | 6/2005 | Wyatt ....................... 324/76.77 |
| 2005/0157829 | A1 * | 7/2005 | Aoyama et al. ............. 375/376 |
| 2008/0172193 | A1 * | 7/2008 | Rhee et al. .................... 702/69 |
| 2008/0232530 | A1 * | 9/2008 | Carballo et al. ............. 375/371 |

FOREIGN PATENT DOCUMENTS

| | | |
|---|---|---|
| EP | 0812075 | 12/1997 |
| JP | 2000332701 | 11/2000 |
| JP | 2004312438 | 11/2004 |

OTHER PUBLICATIONS

5 Star Support, "processor", Apr. 27, 2009.*

* cited by examiner

*Primary Examiner*—Ken N Vanderpuye
*Assistant Examiner*—Tanya Ngo

(57) ABSTRACT

Methods and apparatuses are provided for performing jitter measurements in a transceiver module. Accordingly, there is no need to use expensive test equipment that must be inserted into and removed from the network in order to obtain these measurements. In addition, because the measurements can be obtained at any time without any interruption in communications over the network, jitter performance can be monitored more closely and more frequently to facilitate better and earlier diagnosis of problems that can lead to failures in the network.

5 Claims, 5 Drawing Sheets

METHODS AND APPARATUSES FOR MEASURING JITTER IN A TRANSCEIVER MODULE

TECHNICAL FIELD OF THE INVENTION

The invention relates to optical networks over which data is communicated in the form of optical signals transmitted and received over optical waveguides. More particularly, the invention relates to methods and an apparatuses for measuring jitter performance in the transceiver module with no interruption in communications over the network and without having to insert and remove measurement equipment.

BACKGROUND OF THE INVENTION

In optical communications networks, transceivers are used to transmit and receive optical signals over optical fibers. A laser of the transceiver generates amplitude modulated optical signals that represent data, which are then transmitted over an optical fiber coupled to the transceiver. FIG. 1 illustrates a block diagram of a known transceiver currently used in optical communications, which uses optical feedback to control the average output power level of the laser. The transceiver module 2 includes a transmitter portion 3 and a receiver portion 4. The transmitter and receiver portions 3 and 4 are controlled by a transceiver controller 6. The transmitter portion 3 includes a laser driver 11 and a laser diode 12. The laser driver 11 outputs electrical signals to the laser diode 12 to modulate the laser diode 12 to cause it to output optical signals that have power levels corresponding to logic 1s and logic 0s. An optics system (not shown) of the transceiver module 2 focuses the coherent light beams produced by the laser diode 12 into the end of a transmit optical fiber (not shown).

A low-speed monitor photodiode 14 monitors the output power levels of the laser diode 12 and produces respective electrical analog feedback signals that are delivered to an analog-to-digital converter (ADC) 15, which converts the electrical analog signals into electrical digital signals. The digital signals are input to the transceiver controller 6, which processes them to obtain the average output power level of the laser diode 12. The controller 6 outputs control signals to the laser driver 11 to cause it to adjust the bias current signal output to the laser diode 12 such that the average output power level of the laser diode 12 is maintained at a relatively constant level.

The receiver portion 4 includes a receive photodiode 21 that receives an incoming optical signal output from the end of a receive optical fiber (not shown). An optics system (not shown) of the receiver portion 4 focuses the light output from the end of the receive optical fiber onto the receive photodiode 21. The receive photodiode 21 converts the incoming optical signal into an electrical analog signal. An ADC 22 converts the electrical analog signal into an electrical digital signal suitable for processing by the transceiver controller 6. The transceiver controller 6 processes the digital signals to recover the data represented by the signals.

At times, it is desirable to obtain measurements relating to the optical signals produced by the laser in addition to the average output power level of the laser. For example, tests are commonly performed in networks to measure jitter performance. With respect to optical signals generated by lasers, jitter performance relates to variations in the timing at which the optical signal output from the laser transitions from a logic 1 power level to a logic 0 power level (falling edge) or from a logic 0 power level to a logic 1 power level (rising edge). Jitter is essentially a slight variation in the phase of the optical signal from that of a corresponding ideal waveform. If there is too much jitter in the signal produced by the laser of the transceiver, a receiver that receives the optical signal might detect a logic 1 power level when it should have detected a logic 0 power level, and vice versa.

Jitter performance is usually measured by using test equipment that is inserted into the network. Inserting the test equipment into the network requires that the network be taken down, which is time consuming and burdensome. Likewise, removing the equipment after the measurements have been obtained and putting the network back up is also time consuming and burdensome. In addition, communications are disrupted during the entire process from the time the network is taken down until it is put back up, which of course is undesirable.

It would desirable to provide a way to measure jitter performance that does not require the insertion of equipment into and removal of equipment from the network. It would also be desirable to provide a way to obtain these measurements in real-time with no interruption in communications over the network.

SUMMARY OF THE INVENTION

The invention provides methods and apparatuses for measuring jitter performance in a transceiver module. In accordance with an embodiment, the apparatus comprises a transceiver module. The transceiver module has a photodiode configured to receive an optical signal generated by a laser and convert the optical signal into an electrical signal. Jitter measurement circuitry of the transceiver module is configured to receive the electrical signal and produce a jitter measurement value based on the received electrical signal. The jitter measurement value provides an indication of an amount of jitter that is in the optical signal.

In accordance with an embodiment, the method comprises converting an input optical signal to an electrical signal with a photodiode, receiving the electrical signal in jitter measurement circuitry of the transceiver module and producing a jitter measurement value in the jitter measurement circuitry based on the electrical signal, receiving the jitter measurement value in a processor of the transceiver module, and processing the jitter measurement value in the processor to correlate it to an amount of jitter in the optical signal.

These and other features and advantages of the invention will become apparent from the following description, drawings and claims

DETAILED DESCRIPTION OF ILLUSTRATIVE EMBODIMENTS

In accordance with the invention, methods and apparatuses are provided for measuring jitter performance in real-time inside of the transceiver module. Accordingly, there is no need to use expensive test equipment that must be inserted into and removed from the network in order to obtain these measurements. In addition, because the measurements can be obtained at any time without any interruption in communications over the network, jitter performance can be monitored more closely and more frequently to facilitate better and earlier diagnosis of problems that can lead to failures in the network.

Figure 2:
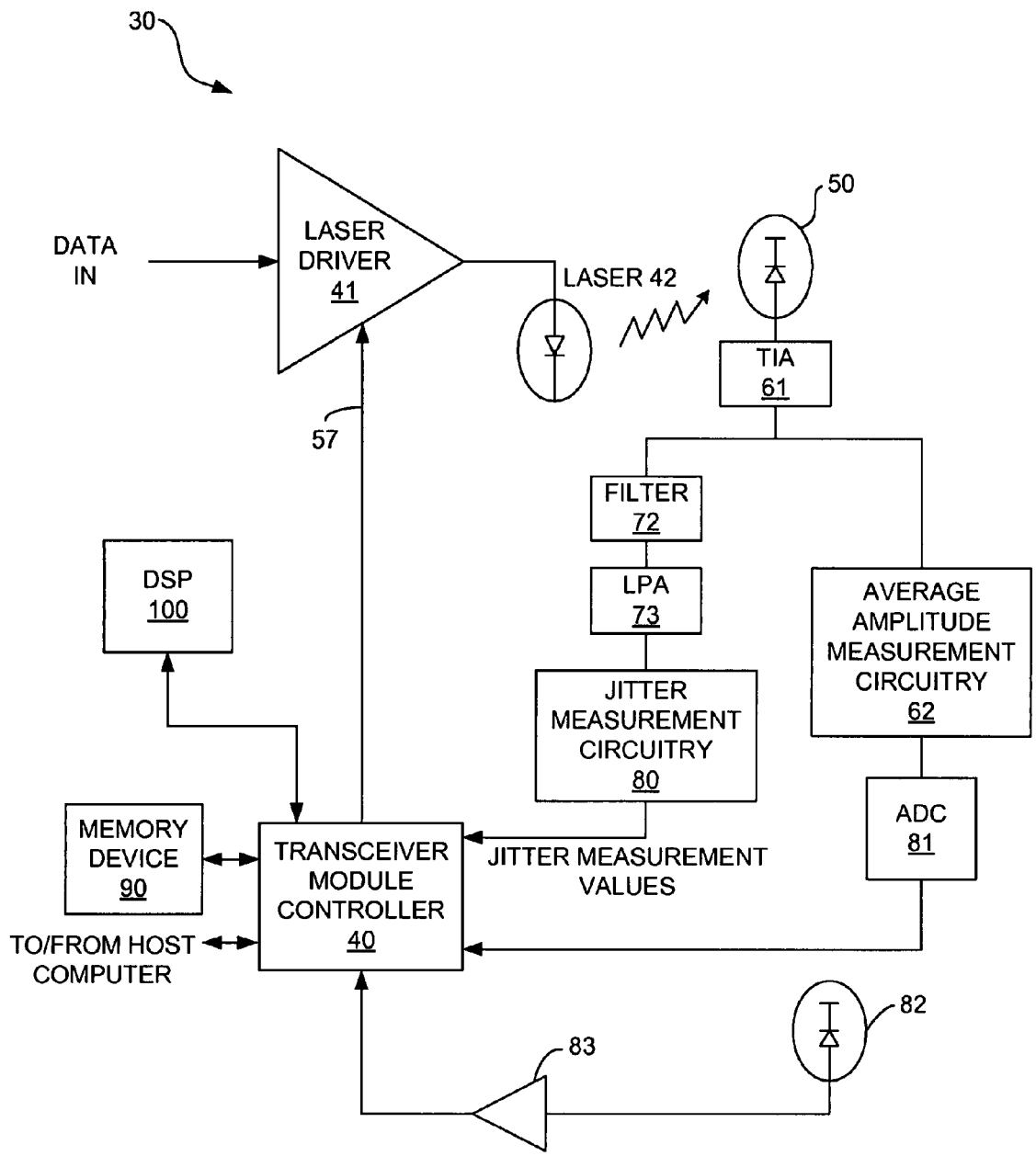
FIG. 2 illustrates a block diagram of the transceiver module in accordance with an illustrative embodiment having circuitry for measuring jitter in the optical signal produced by the laser of the transceiver module.

FIG. 2 illustrates a block diagram of the transceiver module in accordance with an illustrative embodiment having circuitry for measuring jitter in the optical signal produced by the laser of the transceiver module. In accordance with this embodiment, the circuitry in the transceiver module for measuring jitter resides in the transmitter portion of the transceiver module. The transceiver module 30 includes a transceiver module controller 40, a laser driver 41, a laser 42, a high-speed monitor photodiode 50, a transimpedance amplifier (TIA) 61, average amplitude measurement circuitry 62, a bandpass filter 72, a linear post amplifier (LPA) 73, jitter measurement circuitry 80, a high-speed receive photodiode 82, a receive TIA 83, a memory device 90, and a digital signal processor (DSP) 100.

Figure 1:
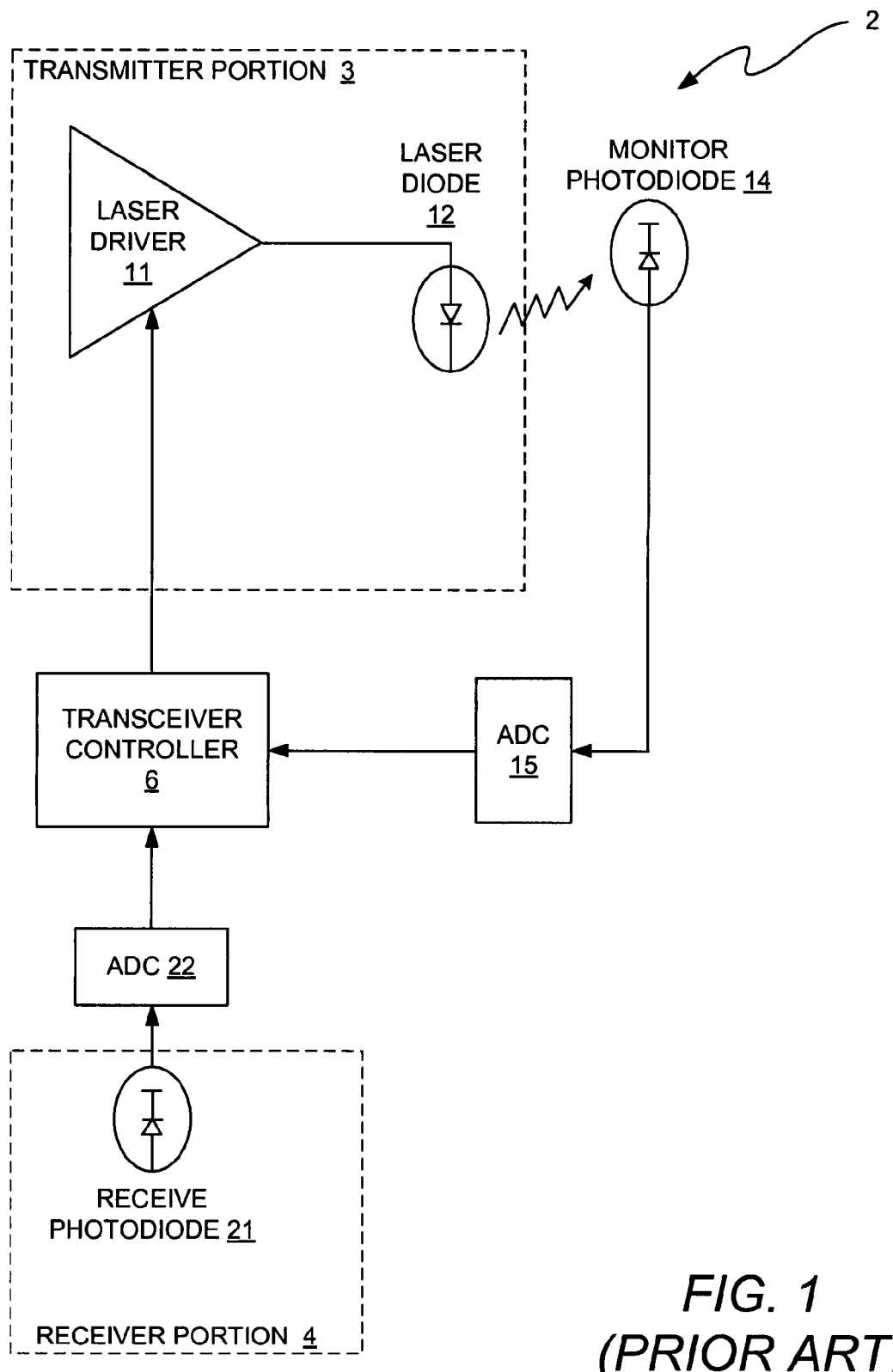
FIG. 1 illustrates a block diagram of a known transceiver currently used in optical communications, which uses optical feedback to control the average output power level of the laser.

As stated above with reference to the known transceiver module shown in FIG. 1, the monitor photodiode used to monitor the laser output power is normally a low-speed photodiode. In the transceiver module 30, a high-speed monitor photodiode 50 is used to monitor the output power level of the laser 42, which is typically a high-speed laser diode operating in the 1 to 10 Gigahertz (GHz) range. While a low-speed monitor photodiode is suitable for use in systems in which only the average output power level of the laser is being measured, a low-speed monitor photodiode is not suitable for use in measuring jitter performance because the phase variations that result in jitter occur too rapidly to be measured with a low-speed monitor photodiode. The high-speed monitor photodiode 50 used in accordance with this embodiment may be any type of high-bandwidth photodiode capable of monitoring the optical output power of the laser 42 and producing a signal having an amplitude that varies with variations in the laser output power level. A variety of PIN photodiodes are suitable for this purpose, such as an Indium Gallium Arsenide (InGaAs) PIN photodiode.

As the laser 42 is modulated by the laser driver 41 based on the data stream input to the laser driver 41, the average amplitude measurement circuitry 62 receives the amplified high-speed signal output from the TIA 61. The average amplitude measurement circuitry 62 is a low-bandwidth analog circuit of the type currently used in the aforementioned known optical feedback circuit shown in FIG. 1 for measuring the average output power level of the laser. The average amplitude measurement circuitry 62 typically includes or is preceded by a lowpass filter device (not shown) that lowpass filters the signal output from the high-speed TIA 61 and produces an average amplitude measurement value corresponding to the average output power level of the laser 42. This average amplitude measurement value is an analog value that is converted into a digital average amplitude measurement value by an analog-to-digital converter (ADC) 81. The digital average amplitude measurement value is then processed by the controller 40 in accordance with a bias current adjustment algorithm that determines, based on the value, whether and by how much to adjust the amplitude of the laser bias current, $I_{BIAS}$, to maintain the average output power level of the laser 42 at an optimum or desired level (typically constant). Signal line 57 represents the control signal output by the controller 40 to the laser driver 41 to cause the laser driver 41 to set the amplitude of $I_{BIAS}$ to a particular value. Because the bias current adjustment algorithm is a known algorithm used to adjust the output power level of the laser based on its measured average output power level, it will not be described herein in the interest of brevity.

The amplified high-speed signal output from the TIA 61 is also received by the bandpass filter 72, which has a center frequency that is equal to the fundamental frequency of the data transmitted by the laser 42. The filter 72 is a fairly narrow-band filter that filters out high frequency harmonics contained in the signal output from the TIA 61. The filtered signal is then amplified by the LPA 73. The amplified signal output from the LPA 73 is then input to the jitter measurement circuitry 80, which measures the jitter in the signal and produces digitized jitter measurement values, as will be described below in detail with reference to FIG. 3. The jitter measurement values are then sent to one or more devices or circuits internal and/or external to the transceiver module 30 and used for various purposes. For example, the transceiver module controller 40 may receive the jitter measurement values and process them in accordance with one or more algorithms that diagnose the health of the laser 42 based on the amount of jitter measured. The transceiver module controller 40 may store the jitter measurement values in the memory device 90 for subsequent processing, such as to perform an algorithm that compares jitter measurement values obtained earlier in time to jitter measurement values obtained later in time to determine whether jitter is increasing to the point that failure of the laser 42 is likely to occur in the near future.

The transceiver module controller 40 may send the jitter measurement values to the DSP 100, which will then process the values in accordance with one or more algorithms to make some useful determinations, such as if failure of the laser 42 is imminent or whether the level of jitter measured is an indication of some other problem with the transceiver module 30 or network components upstream or downstream of the transceiver module 30. The transceiver module controller 40 may send the jitter measurement values to a host computer (not shown), which may then perform one or more of these or other types of algorithms.

Figure 3:
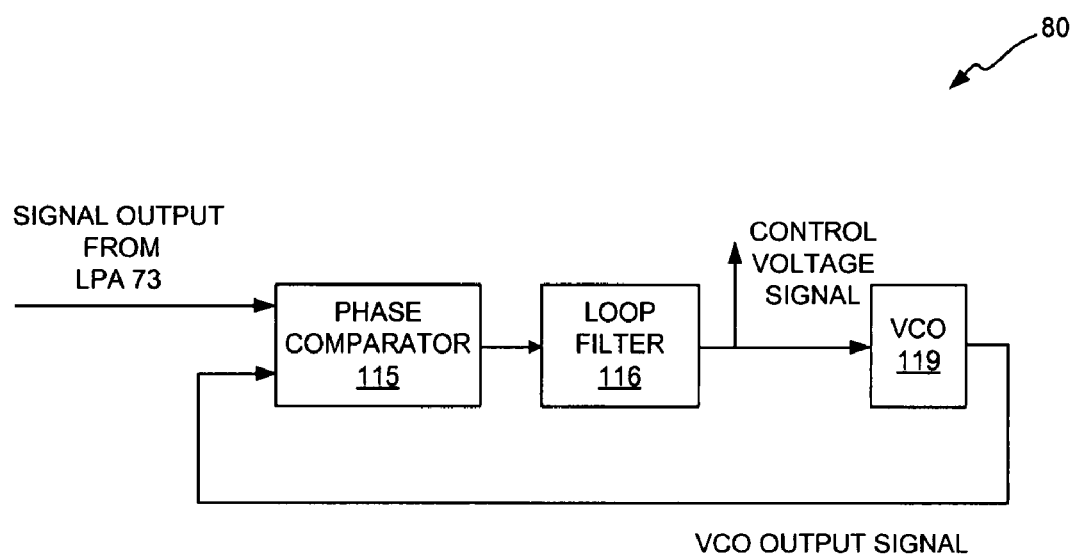
FIG. 3 illustrates a block diagram of the jitter measurement circuitry shown in FIG. 2 in accordance with an illustrative embodiment.

FIG. 3 illustrates a block diagram of the jitter measurement circuitry 80 shown in FIG. 2 in accordance with an illustrative embodiment. The jitter measurement circuitry 80 in accordance with this embodiment is a phase-locked loop (PLL). The PLL comprises a phase comparator 115, a loop filter 116 and a voltage controlled oscillator (VCO) 119. The signal output from the LPA 73 shown in FIG. 2 is input to the phase comparator 115 of the PLL. The VCO 119 is set to be centered about the fundamental frequency of the data signal generated by the laser 42. The PLL is a negative feedback control system that maintains a known phase and frequency relationship between the signal output from the VCO 119 and the signal input to the phase comparator 115. The phase comparator 115 compares the phase of the signal output from the VCO 119 with the phase of the signal input to the phase comparator 115 to produce a phase error signal corresponding to the difference between the phase of the signal output from the VCO 119 and the phase of the signal input to the phase comparator 115. This phase error corresponds to the phase variation in the signal output from the TIA 61, which is a measure of the jitter in the optical signal output from the laser 42. The loop filter 116 processes the phase error signal output from the phase comparator 115 and produces a control voltage signal that is used to steer VCO 119 over the frequency tuning range of the VCO 119 in order to maintain phase lock with the input signal to the phase comparator 115.

The control voltage signal output from the loop filter 116 corresponds to the jitter measurement value that is sent to the transceiver module controller 40 and/or to the DSP 100 from the jitter measurement circuitry 80 for processing in order to correlate the control voltage signal to jitter. The DSP 100 will typically perform this process, although the process could be performed by some other component in the transceiver module or by some component that is external to the transceiver module. The digital jitter measurement values are further processed to correlate them to the actual jitter. Once this correlation process has been performed, other algorithms may be performed as described above to obtain, for example, information regarding the health of the laser 42 and/or other components in the transceiver module 30 or network.

It should be noted that the PLL is only one of several suitable circuits for measuring the phase variations in the signal output from the TIA 61. Persons skilled in the art will understand the manner in which other suitable circuits may be designed for this purpose. For example, an ATB detector is another known circuit that is suitable for this purpose. The up/down signals of an ATB detector can be processed in a DSP or other computational device to measure the jitter characteristics of the incoming signal.

Figure 4:
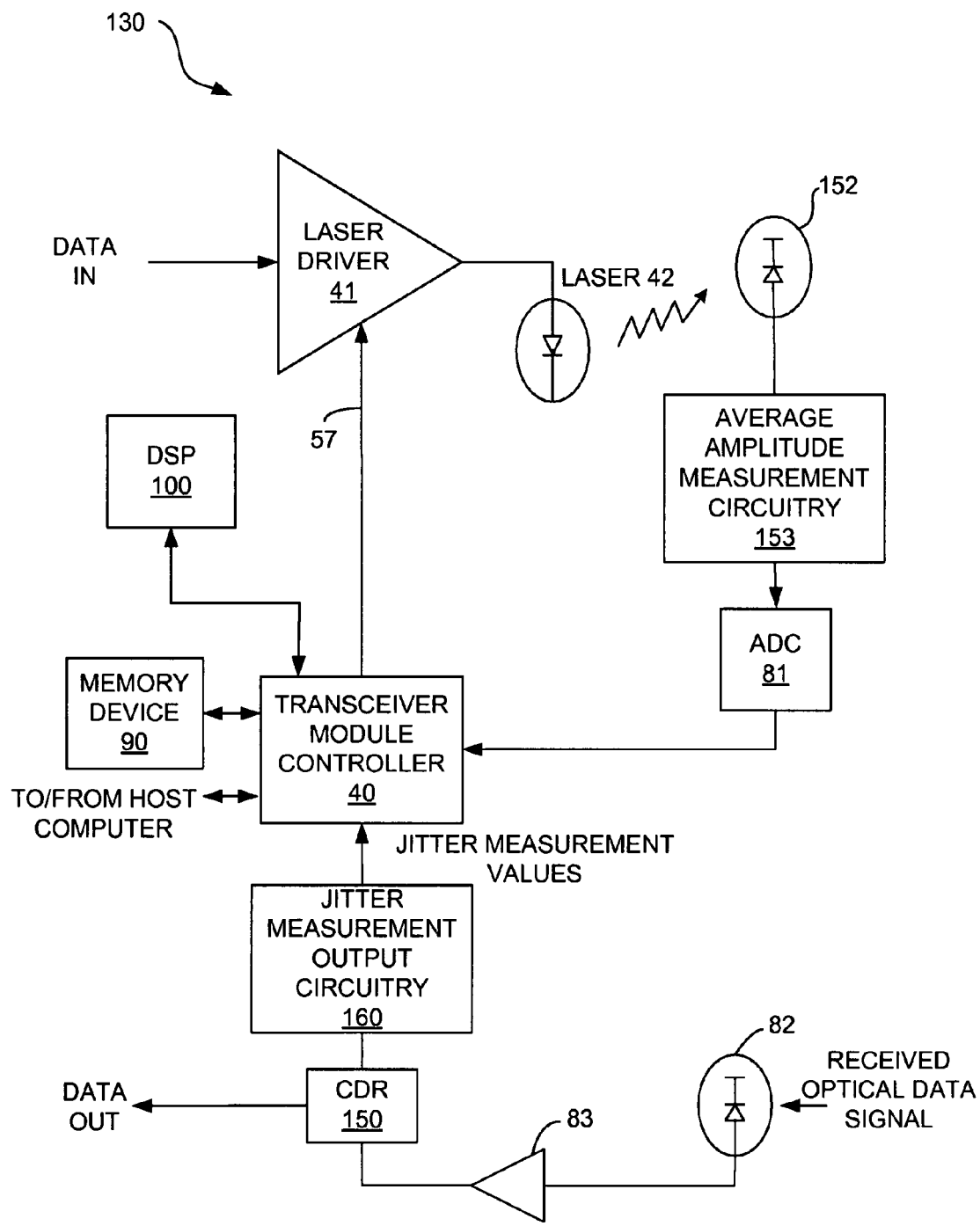
FIG. 4 illustrates a block diagram of the jitter measurement circuitry shown in FIG. 2 in accordance with another illustrative embodiment.

FIG. 4 illustrates a block diagram of a transceiver module 130 in accordance with another illustrative embodiment. In accordance with this embodiment, the circuitry in the transceiver module 130 for measuring jitter resides in the receiver portion of the transceiver module 130. The jitter being measured is jitter in an optical signal generated by a laser (not shown) that is external to the transceiver module 130. The transceiver module 130 shown in FIG. 4 is similar to the transceiver module 30 shown in FIG. 2. Therefore, like numerals used in FIGS. 2 and 4 represent identical elements, although it is not necessary for the elements to be identical. One difference is that the receiver portion of the transceiver module 130 shown in FIG. 4 includes clock and data recovery (CDR) circuit 150 and jitter measurement output circuitry 160, which are not shown in FIG. 2. Although the transceiver module 30 shown in FIG. 2 could have a CDR circuit, it is not necessary for the transceiver module 130 to include a CDR circuit.

Another difference between the transceiver module 30 shown in FIG. 2 and the transceiver module 130 shown in FIG. 4 is that the laser monitoring feedback loop of the transceiver module 130 shown in FIG. 4 may be a low-speed monitoring feedback loop, such as that shown in FIG. 1, for example. Consequently, the monitor photodiode 152 used in the transceiver module 130 shown in FIG. 4 may be a low-speed photodiode since the jitter measurements are not made based on the output of the monitor photodiode 152, but are made in the receiver portion based on the output of the receive photodiode 82, as will now be described.

Many optical transceiver modules currently manufactured today include a CDR circuit, which typically includes a PLL of the type described above with reference to FIG. 3. In accordance with the illustrative embodiment shown in FIG. 4, the transceiver module 130 includes a CDR circuit 150, which includes the PLL shown in FIG. 3. The incoming signal on the receive optical fiber (not shown) is received by the high-speed photodiode 82 and converted into an electrical signal. This electrical signal is then amplified by a TIA 83. The output of the TIA 83 is then input to the phase comparator 115 (FIG. 3). The phase error signal output by the phase comparator 115 is filtered by the loop filter 116 (FIG. 3) to produce the VCO control voltage signal. The VCO control voltage signal output from the loop filter 116 is used to steer the VCO 119 (FIG. 3). This VCO control voltage signal is also tapped by jitter measurement output circuitry 160 (FIG. 4) and used as a jitter measurement value. This jitter measurement value is then sent to the transceiver module controller 40, the DSP 100 or some other device for further processing as described above to correlate this value to the jitter contained in the optical signal received by the receiver portion of the transceiver module 130.

The controller 40 and/or the DSP 100 of the transceiver module 130 shown in FIG. 4 may also perform algorithms that determine the health of the laser (not shown) that generated the received optical signal and/or other components in the network. The invention is not limited with respect to how the measurements of jitter are used or processed after they have been obtained.

Figure 5:
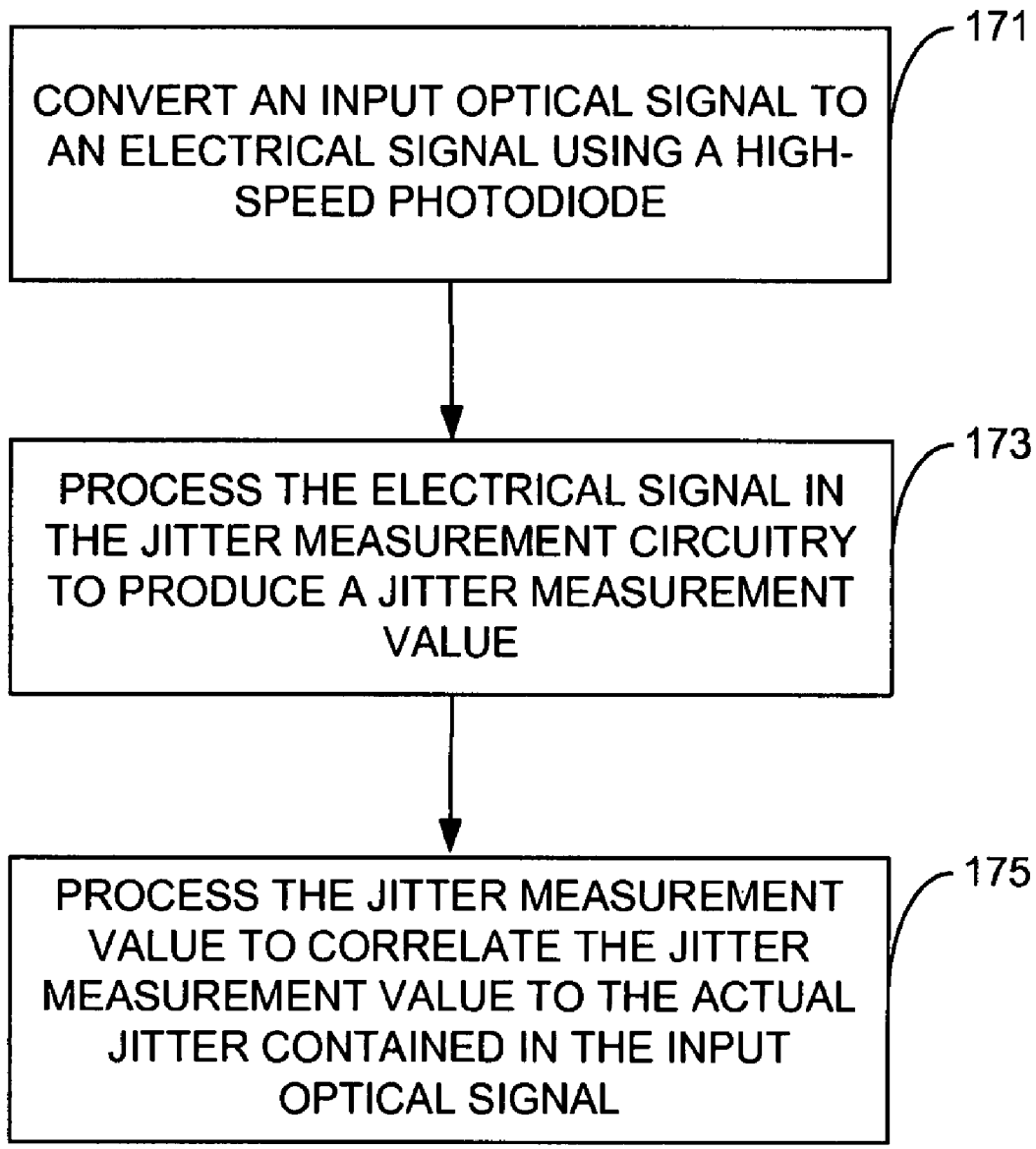
FIG. 5 illustrates a flowchart that represents the method in accordance with an illustrative embodiment for measuring jitter in a transceiver module.

FIG. 5 illustrates a flowchart that represents the method in accordance with an illustrative embodiment for measuring jitter in a transceiver module. As described above, an optical signal is converted into an electrical signal by a high-speed photodiode, as indicated by block 171. This electrical signal is then conditioned by filtering and amplification and input to jitter measurement circuitry within the transceiver module. The jitter measurement circuitry then processes the electrical signal to produce a jitter measurement value, as indicated 173. The jitter measurement value if then processed to correlate the jitter measurement value to the actual jitter contained in the input signal, as indicated by block 175.

The algorithms that are performed in the DSP 100 and/or in the controller 40 may be performed in hardware, software or a combination of hardware, software and/or firmware. If the algorithms are performed at least partially in software, the corresponding computer instructions will be stored in some type of computer-readable medium, such as in memory device 90, for example. The computer-readable medium that is used for this purpose may be any type of computer-readable medium, such as, for example, a random access memory (RAM) device, a read-only memory (ROM) device, etc. The computer-readable medium may be a solid state device or some other type of memory device. Similarly, the controller 40 and DSP 100 may be any types of computational devices, including, but not limited to, microprocessors, microcontrollers, application specific integrated circuits (ASICs), programmable logic arrays (PLAs), programmable gate arrays (PGAs), etc.

The invention has been described with reference to particular illustrative embodiments for the purposes of describing the principles and concepts of the invention. However, persons skilled in the art will understand, in view of the description provided herein, that the invention is not limited to these embodiments and that modifications may be made to these embodiments without deviating from the scope of the invention. For example, while a PLL and an ATB detector are suitable circuits for detecting phase variations in the signal that correspond to jitter, persons skilled in the art will understand that other circuits can be designed and built that are equally suitable for this purpose.

What is claimed is:

1. A transceiver module comprising:

a photodiode configured to receive an optical signal generated by a laser and convert the optical signal into an electrical signal;

a first amplifier coupled to the photodiode for amplifying the electrical signal;

a filter coupled to the first amplifier for reducing a bandwidth of the electrical signal;

a second amplifier coupled to the filter;

permanent jitter measurement circuitry coupled to the second amplifier and configured to receive the electrical signal, the jitter measurement circuitry configured to produce a jitter measurement value based on the received electrical signal, the jitter measurement value providing an indication of an amount of jitter that is in the optical signal, wherein the jitter measurement circuitry comprises a frequency detector that produces the jitter measurement value, wherein the frequency detector comprises a phase-locked loop (PLL), the PLL comprising a phase comparator, a loop filter and a voltage controlled oscillator (VCO), the phase comparator obtaining a phase difference between the electrical signal received by the jitter measurement circuitry and a clock signal of the VCO, the loop filter receiving the phase difference and producing a control voltage signal that is used by the VCO to adjust a frequency of the VCO clock signal, the control voltage signal corresponding to the jitter measurement value;

average amplitude measurement circuitry coupled to the first amplifier;

an analog-to-digital-converter coupled to the amplitude measurement circuitry for converting analog amplitude measurement signals to digital amplitude measurement signals; and a processor coupled to the analog-to-digital-converter and to the permanent jitter measurement circuitry, the processor determining whether to adjust bias of the laser based on the digital amplitude measurement signals, the processor receiving the jitter measurement value and correlating the jitter measurement value to an amount of jitter contained in the optical signal.

2. The transceiver module of claim 1, wherein the laser is a laser of the transceiver module used to transmit data, the optical signal generated by the laser corresponding to an optical data signal, and wherein the photodiode is a monitor photodiode contained in the transceiver module, the monitor photodiode monitoring optical feedback corresponding to at least a portion of the optical signal generated by the laser and converting the portion of the received optical signal into an electrical feedback signal, the electrical feedback signal corresponding to the electrical signal received by the jitter measurement circuitry.

3. The transceiver module of claim 1, wherein the monitor photodiode is a high-speed photodiode capable of detecting and recovering data contained in the optical signal generated by the laser.

4. The transceiver module of claim 1, wherein the processor performs an algorithm that determines a likelihood that the laser will fail based on the actual amount of jitter contained in the optical signal.

5. The transceiver module of claim 1, wherein the jitter measurement value is transmitted to a host computer that is in communication with the transceiver module.

* * * * *